(12) United States Patent
Rao et al.

(10) Patent No.: US 11,034,362 B2
(45) Date of Patent: Jun. 15, 2021

(54) PORTABLE PERSONALIZATION

(71) Applicant: Harman International Industries, Incorporated, Stamford, CT (US)

(72) Inventors: Rashmi Rao, West Bloomfield, MI (US); Timothy Raymond VanGoethem, Milford, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 142 days.

(21) Appl. No.: 16/315,108

(22) PCT Filed: Jul. 7, 2017

(86) PCT No.: PCT/US2017/041244
§ 371 (c)(1),
(2) Date: Jan. 3, 2019

(87) PCT Pub. No.: WO2018/009897
PCT Pub. Date: Jan. 11, 2018

(65) Prior Publication Data
US 2020/0114931 A1    Apr. 16, 2020

Related U.S. Application Data

(60) Provisional application No. 62/359,629, filed on Jul. 7, 2016.

(51) Int. Cl.
*B60W 50/08* (2020.01)
*G10L 15/26* (2006.01)
(Continued)

(52) U.S. Cl.
CPC ......... *B60W 50/085* (2013.01); *B60R 16/037* (2013.01); *B60W 40/09* (2013.01);
(Continued)

(58) Field of Classification Search
USPC ......................................................... 701/49
See application file for complete search history.

(56) References Cited

U.S. PATENT DOCUMENTS

2012/0121185 A1    5/2012  Zavesky
2013/0204457 A1    8/2013  King et al.
(Continued)

FOREIGN PATENT DOCUMENTS

EP    2784763 A1    10/2014
WO    02073535 A2    9/2002
(Continued)

OTHER PUBLICATIONS

ISA United States Patent and Trademark Office, International Search Report Issued in Application No. PCT/US2017/041244, Sep. 29, 2017, WIPO, 1 page.
(Continued)

*Primary Examiner* — Tyler D Paige
(74) *Attorney, Agent, or Firm* — McCoy Russell LLP

(57) ABSTRACT

Embodiments are disclosed for an example in-vehicle computing system for a vehicle. In some embodiments, a personalized interactive experience within the vehicle is provided responsive to identification of a user in the vehicle. The user may be identified based on biometric data detection, which may include eye tracking, pupil monitoring, and head tracking in some examples. Features of the in-vehicle computing system may be selectively provided based on the identified user and/or learned data relating to the user and/or conditions of the vehicle.

20 Claims, 10 Drawing Sheets

(51) Int. Cl.
  *B60R 16/037* (2006.01)
  *B60W 40/09* (2012.01)
  *G06F 21/32* (2013.01)
  *G06K 9/00* (2006.01)

(52) U.S. Cl.
  CPC ......... *G06F 21/32* (2013.01); *G06K 9/00892* (2013.01); *G10L 15/26* (2013.01)

(56) References Cited

U.S. PATENT DOCUMENTS

| | | |
|---|---|---|
| 2013/0271370 A1 | 10/2013 | Wang et al. |
| 2014/0274147 A1* | 9/2014 | Kennedy ................. H04L 51/14 455/456.3 |
| 2014/0371984 A1 | 12/2014 | Fung et al. |
| 2015/0053066 A1* | 2/2015 | Hampiholi ........... G10H 1/0008 84/602 |
| 2015/0123818 A1 | 5/2015 | Sellschopp |
| 2015/0284008 A1 | 10/2015 | Tan et al. |
| 2015/0353039 A1 | 12/2015 | Graham |
| 2016/0046298 A1* | 2/2016 | DeRuyck ............... B60W 50/14 340/576 |
| 2016/0109701 A1 | 4/2016 | Goldman-Shenhar et al. |
| 2020/0064444 A1* | 2/2020 | Regani .................... G01S 7/415 |

FOREIGN PATENT DOCUMENTS

| | | |
|---|---|---|
| WO | 2014113349 A1 | 7/2014 |
| WO | 2014206406 A1 | 12/2014 |
| WO | 2018145130 A1 | 8/2018 |

OTHER PUBLICATIONS

European Patent Office, Extended European Search Report Issued in Application No. 17825049.4, dated Feb. 5, 2020, Germany, 12 pages.

* cited by examiner

PORTABLE PERSONALIZATION

CROSS REFERENCE TO RELATED APPLICATIONS

The present application is a national phase application of International Patent Application Serial No. PCT/US2017/041244, entitled "PORTABLE PERSONALIZATION," filed on Jul. 7, 2017. International Patent Application No. PCT/US2017/041244 claims priority to U.S. Provisional Application No. 62/359,629, entitled "PORTABLE PERSONALIZATION," filed on Jul. 7, 2016. The entire contents of each of the above-listed applications are hereby incorporated by reference for all purposes.

FIELD

The disclosure relates to the field of in-vehicle computing systems.

BACKGROUND AND SUMMARY

With the rise of computing device integration in various products, such as household appliances and vehicles, as well as the pervasive use of personal computing devices, users may interact with a multitude of different devices in diverse environments. While many of these devices may include communication systems to connect the devices to a network, interoperability of the devices remains limited. A holistic user experience may be offered for consumer interactions with various systems and locations. For example, a proliferation of Smartphone Personal Assistants are training end-consumers to interact with digital systems through natural dialogue. In some examples, different personal assistants are tailored for different contexts (e.g., including specialized programming and/or outputs corresponding to the associated context). Other internet of things (IoT) initiatives happening in the home and office setting further create the expectation that all devices that consumers interact with are able to recognize who they are, are able to communicate with other systems or services to accomplish tasks, and can engage the user in an intuitive manner. The disclosure provides mechanisms to allow vehicles to participate in broader ecosystems for frictionless transition of content and control between home, vehicle, and personal devices.

System integration of various in-cabin sensing elements, predictive learning and interaction, and cloud-based intelligence and analytics may be involved in tying these ecosystems together. Such elements may include: eye/facial/pupil recognition which enables identification and object recognition; contextual and responsive human-machine interactions (HMI) which aggregates inputs from user interactions, multiple vehicle inputs/inputs from multiple vehicles, and other auxiliary vehicle data in conjunction with a cloud-based deep learning engine to derive trends and personalize the in-car experience; and a conversational voice (digital assistant) which simplifies complex interactions and learns to support how the user works. The disclosed systems and methods may further include productivity features that bridge the gap between car, office, and home environments. The categories for these technologies include component or technical parts and information technology (IT) or applications (Apps).

BRIEF DESCRIPTION OF THE DRAWINGS

The disclosure may be better understood from reading the following description of non-limiting embodiments, with reference to the attached drawings, wherein below.

DETAILED DESCRIPTION

The present disclosure describes technologies that may be utilized to develop a system to collect eye tracking, pupil data, and other biometric and car sensor outputs, and process the information in real time to assess a driver's head position and other factors indicating the driver's intent. A digital signal processor (DSP) may be used for filtering and machine learning to create meaningful metrics and models on how the interactions and intents translate during driving situations into trends and predictive intelligence. All analysis and annotation may use a combination of deep neural network (DNN) algorithms and human input.

The technologies may utilize the integration of multi-modal human-machine interface (HMI), e.g., eye gaze as an interaction method with a conversational system that simplifies the user interface. The technologies may combine object recognition with eye gaze tracking as a user interface to specify which object the user is attempting to recognize out of multiple ones with real-time segmentation. Facial/eye recognition measures pupil diameter via an eye tracker and separate light reflex from cognitive load. Deep learning engines are used to annotate and analyze parties via a dashboard that will allow for feature acceptance and personalization.

The eye/facial recognition system is potentially greater than 1 DIN (e.g., where DIN represents the depth of an input volume taken in by a convolutional layer of the DNN). The main performance outputs may include: a "quiet" (e.g., with minimal disruption to or interruption of the driver's driving experience), intuitive, harmonized HMI that makes the drive fun and productive, recognition of the user by the vehicle via facial recognition that adapts to a profile and leads to continued user experience on other devices and locations, productivity software integration that automatically provides in-car productivity, and predictive and preventative maintenance for the vehicle. The technologies may create a natural interaction with the vehicle occupants, anticipate user needs, and simplify task completion.

Improvements in daily use may be perceptible for the end customer in the following ways: personalizing the experience creates a bond between the driver and the car; and the car could help ensure that the driver is optimally operating the vehicle, and help anticipate the driver's needs based on the driver's calendar, activities, personal preferences, etc., and help recommend intuitive and contextual information.

Figure 1A:
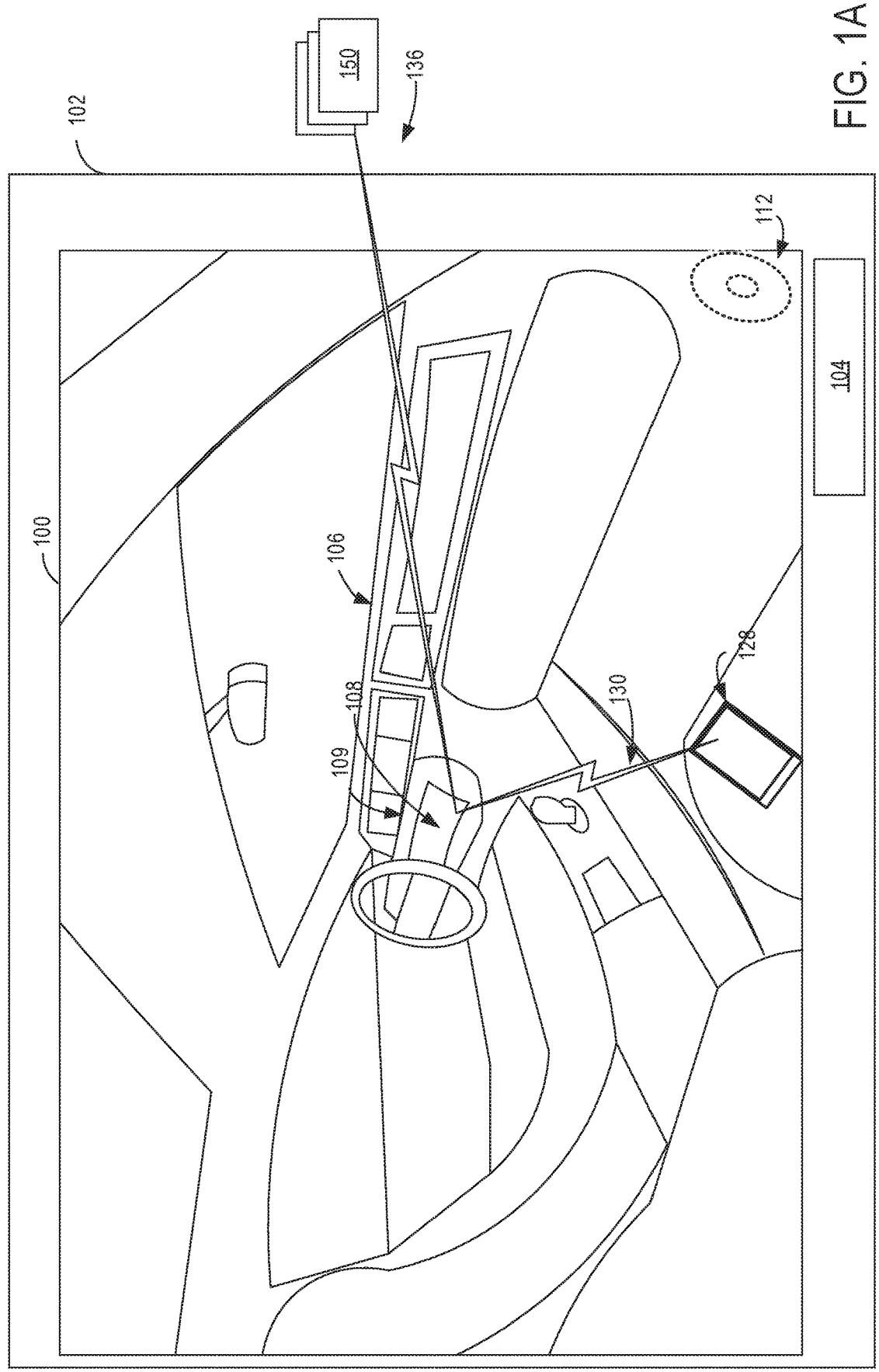
FIG. 1A shows an example partial view of a vehicle cabin in accordance with one or more embodiments of the present disclosure.

FIG. 1A shows an example partial view of one type of environment for a driver assistance system: an interior of a cabin 100 of a vehicle 102, in which a driver and/or one or more passengers may be seated. Vehicle 102 of FIG. 1A may be a motor vehicle including drive wheels (not shown) and an internal combustion engine 104. Vehicle 102 may be a leading vehicle or a trailing vehicle. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (an example of a user) of vehicle 102. For example, instrument panel 106 may include a touch screen 108 of an in-vehicle computing system 109 (e.g., an infotainment system), an audio system control panel, and an instrument cluster. While the example system shown in FIG. 1A includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, cameras to detect activity or objects within the cabin and/or to detect activity, traffic, objects, etc. outside of the cabin, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128, described in more detail below.

Cabin 100 may include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, the external devices 150 may include in-vehicle computing devices of another vehicle, as such the vehicle may be a vehicle leading the vehicle 102, or may be a vehicle trailing behind vehicle 102.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 1B:
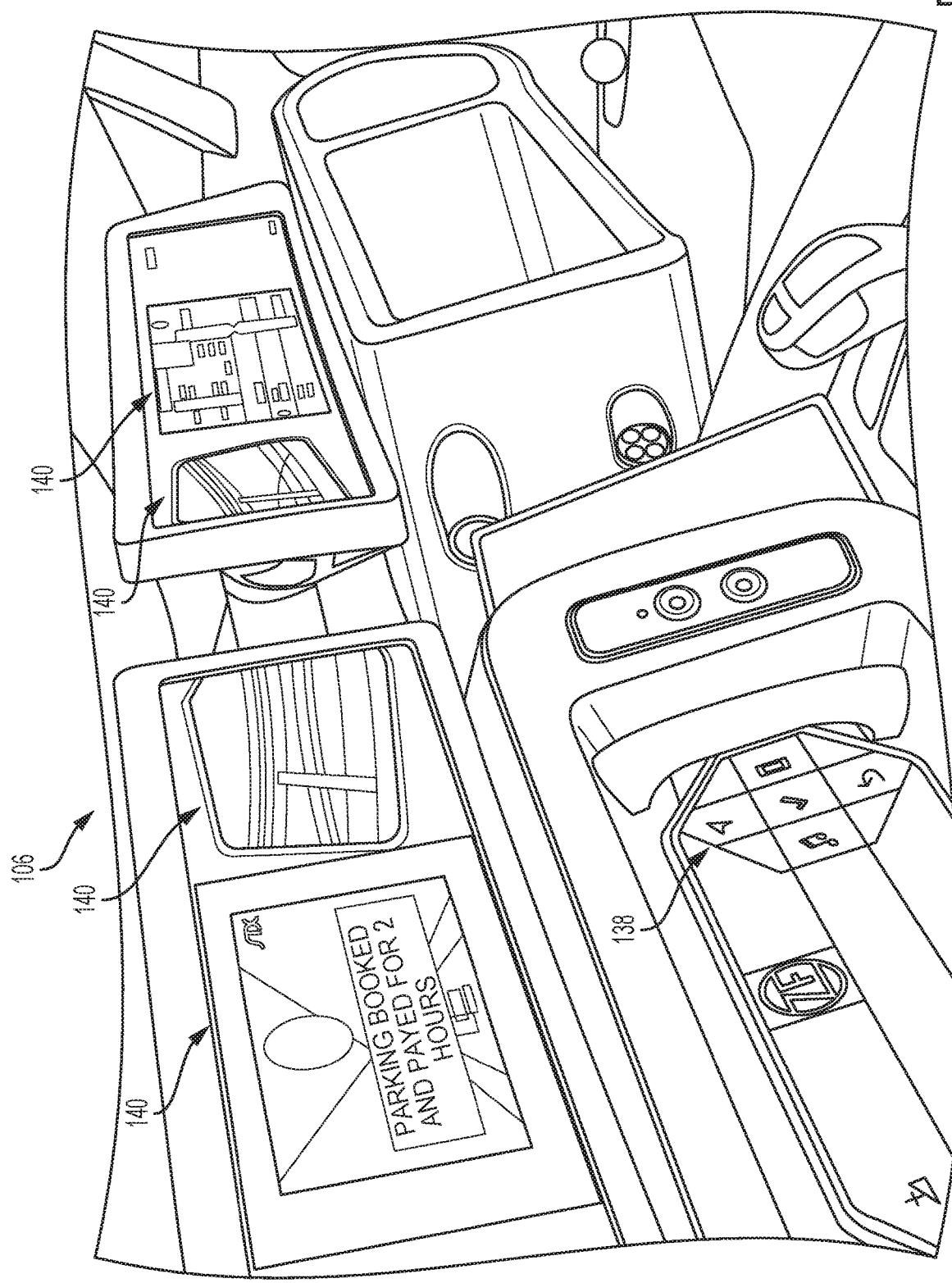
FIG. 1B shows an example detail view of a portion of the cabin of FIG. 1A in accordance with one or more embodiments of the present disclosure.

FIG. 1B shows a detailed view of the instrument panel 106 of FIG. 1A. As shown, the instrument panel 106 may include audio controls 138 and one or more displays 140 (e.g., which may include touch screens such as touch screen 108 of FIG. 1A). Additional or alternative components or arrangements of components may be included in a vehicle cabin in other examples.

Figure 2:
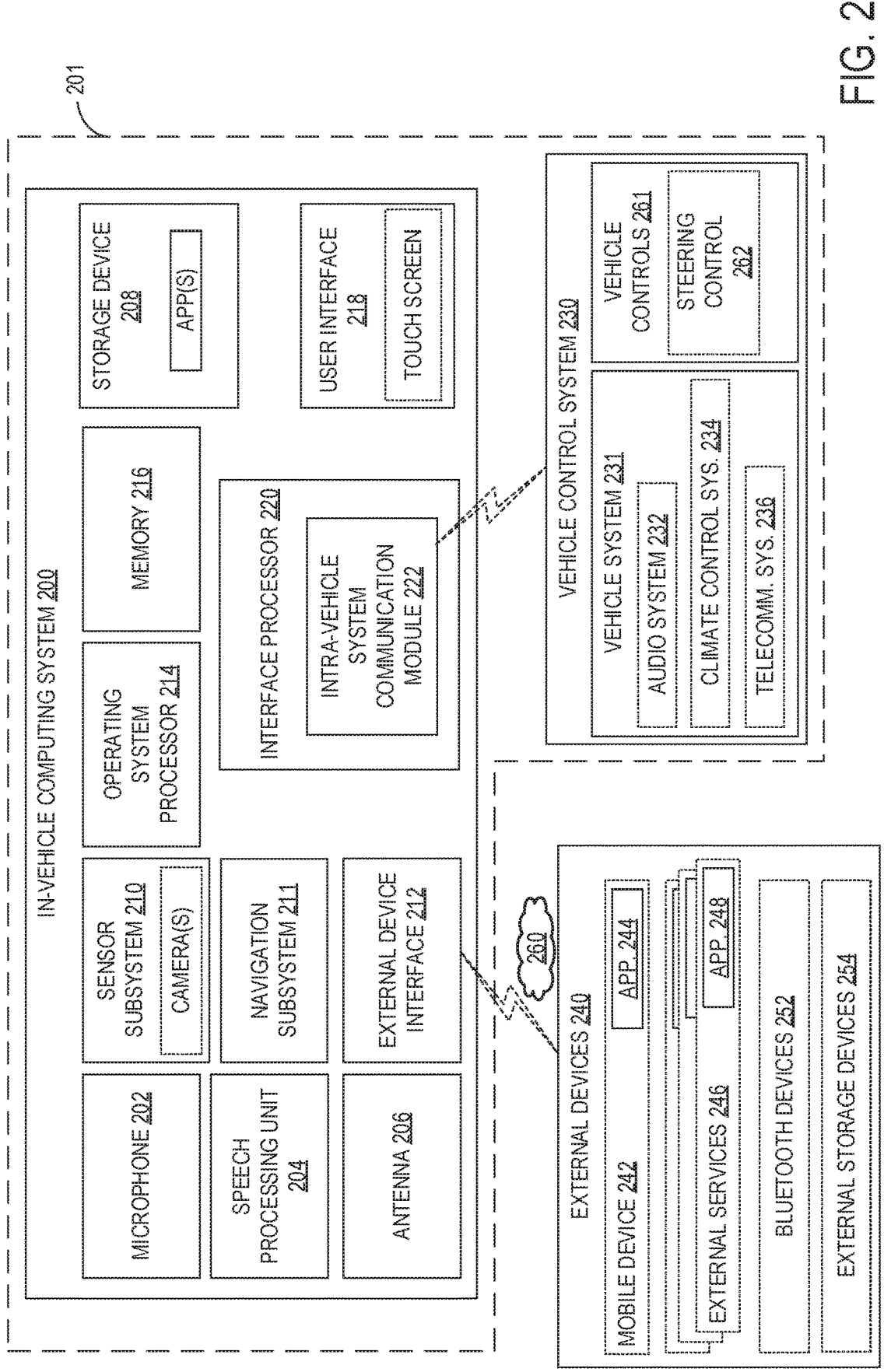
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1A and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an intra-vehicle system communication module 222.

Intra-vehicle system communication module 222 may output data to other vehicle systems 231 and vehicle control elements 261, while also receiving data input from other vehicle components and systems 231, 261, e.g. by way of vehicle control system 230. When outputting data, intra-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1A, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
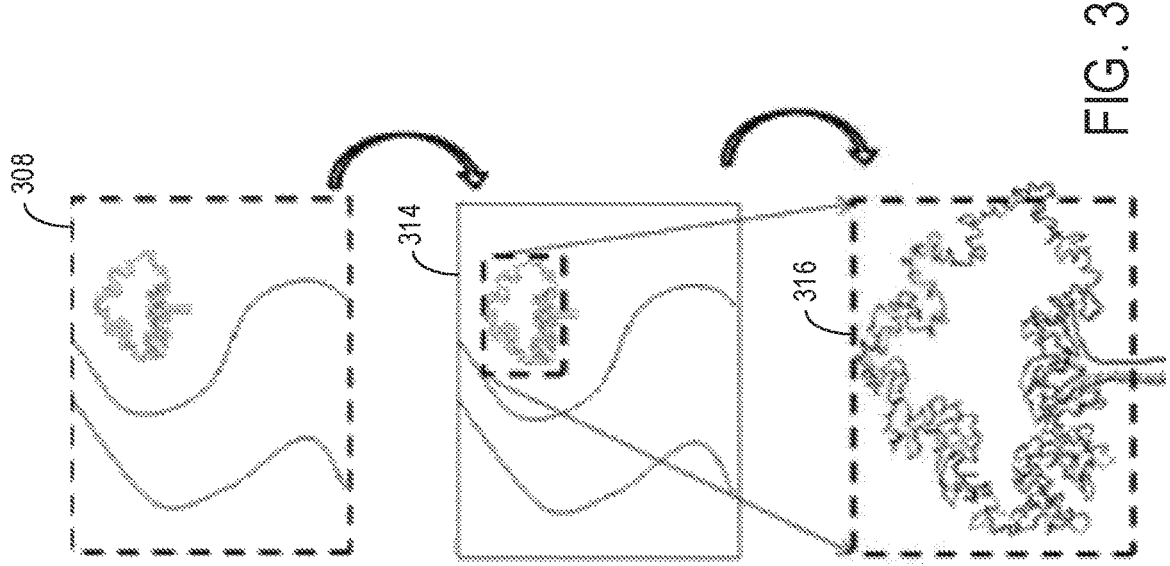
FIG. 3 schematically shows an example camera control system in accordance with one or more embodiments of the present disclosure.
Figure 3:
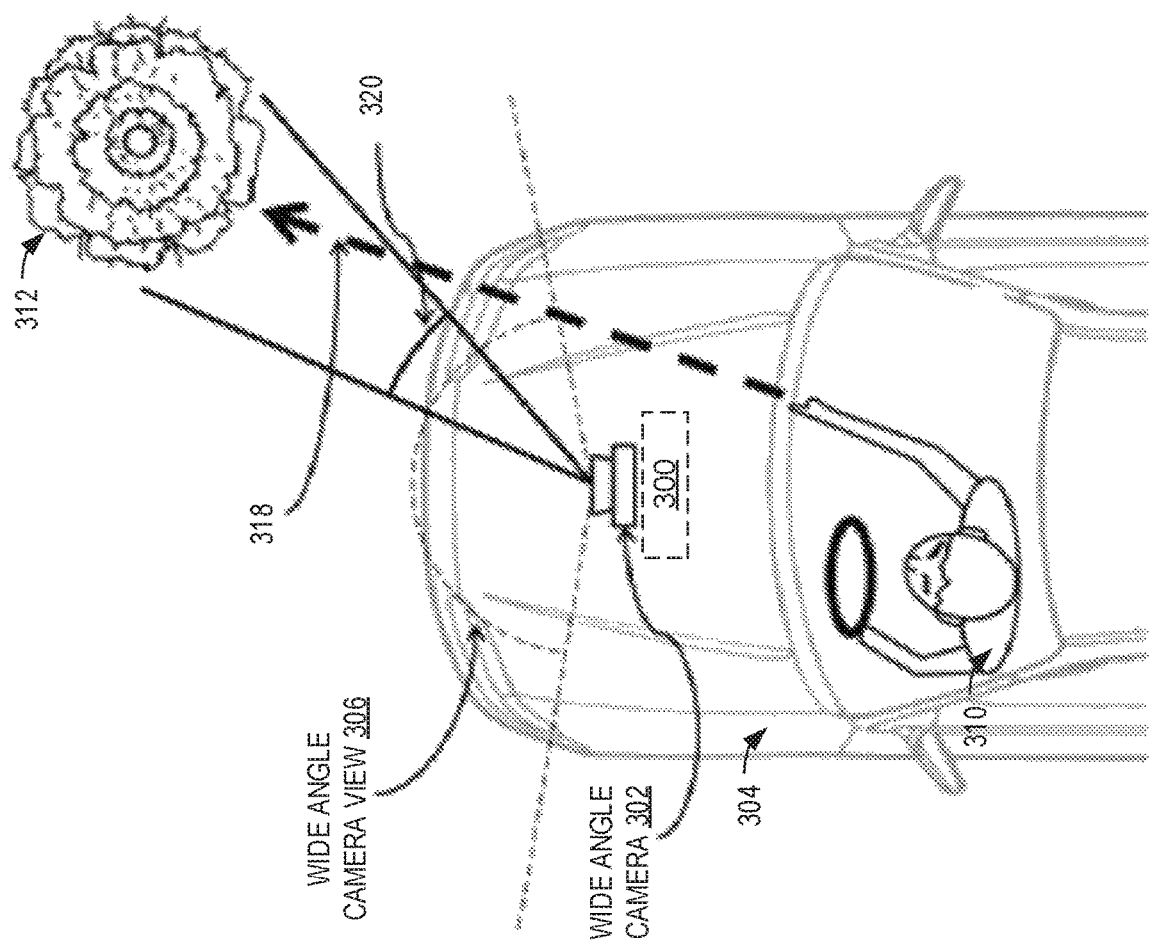

FIG. 3 schematically shows an example camera control system utilizing components of an in-vehicle computing system 300 which may include and/or be coupled to a one or more vehicle cameras 302 of a vehicle 304. In-vehicle computing system 300 may include and/or be included in in-vehicle computing system 109 of FIG. 1A and/or in-vehicle computing system 200 of FIG. 2. As an example, camera 302 may include a wide angle camera, a field of view of which is schematically shown at 306. An example camera view (e.g., based on the field of view 306) is shown at 308. A driver 310 may interact with and control the camera via gestures. For example, the driver 310 may point at an object of interest 312 in order to request that the camera focuses on or otherwise processes the object. Responsive to detecting the driver's pointing gesture (e.g., via one or more cabin-facing cameras configured to image the driver, passengers, and/or other objects in the cabin of the vehicle 304), the in-vehicle computing system 300 may send control instructions to the camera 302 and/or otherwise process images from the camera 302 in order to select a camera view based on the driver's pointing. An example of the camera view that is computationally selected (e.g., from a gesture such as a pointing gesture from the driver) is indicated at 314. An example final view is shown at 316, and may be sent to an object recognition module of the in-vehicle computing system 300 and/or an off-board (e.g., server) computing device. The final view 316 may include the object of interest 312 that intersects with the driver's pointing direction 318. For example, a sub-section 320 of the wide angle field of view of the camera may be selected based on the driver's pointing direction 318 to generate the final view 316 and/or to otherwise command the camera to focus on an object that intersects the driver's pointing direction. In this way, the driver may perform actions in the vehicle that are interpreted by the in-vehicle computing system 300 to control the camera 302 and/or the processing of images captured by the camera 302.

Figure 4:
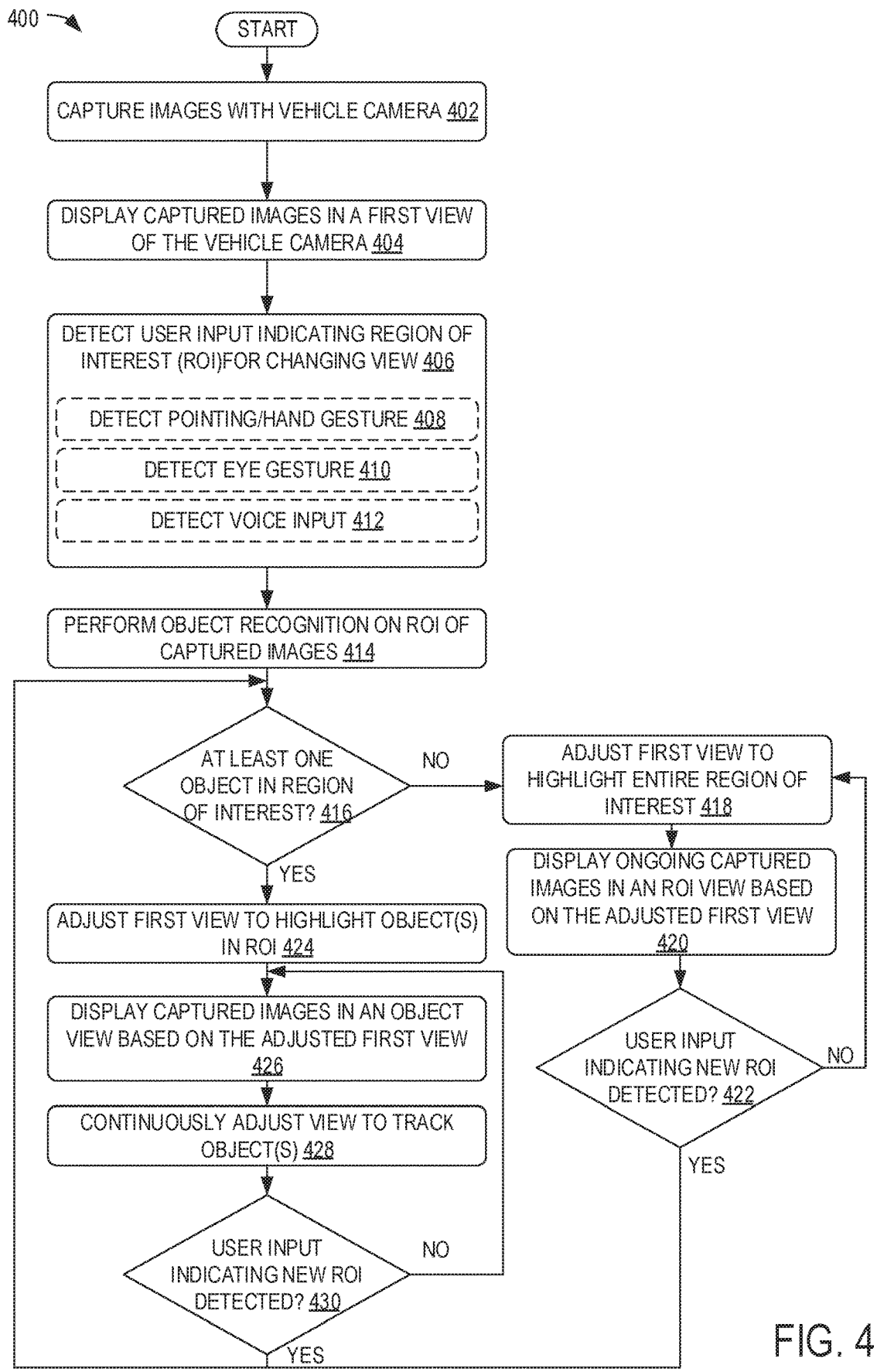
FIG. 4 shows a flow chart of an example method for controlling a camera with user input in accordance with one or more embodiments of the present disclosure.

FIG. 4 is a flow chart for an example method 400 of controlling a camera view based on a user gesture. Method 400 may be performed by an in-vehicle computing system, such as in-vehicle computing system 109 of FIG. 1A and/or in-vehicle computing system 200 of FIG. 2. At 402, the method includes capturing images with a vehicle camera (e.g., camera 302 of FIG. 3). The captured images may be a continuous stream of images and/or a semi-continuous stream of images forming a live view of an environment of the vehicle. At 404, the method includes displaying captured images in a first view of the vehicle camera. For example, the first view may be a full view, such as a view showing a full field of view of the vehicle camera.

At 406, the method includes detecting user input indicating a region of interest (ROI) for changing a view of the camera. As indicated at 408, the user input may be a pointing and/or other hand gesture (e.g., as shown in FIG. 3). In another example, the user input may be an eye gesture, as indicated at 410. In either of the above examples, a direction indicated by the pointing, hand, and/or eye gesture may be analyzed to determine a point of intersection with a field of view of the vehicle camera. For example, a vector extending from a finger of a user performing a pointing gesture and/or a vector extending from a pupil of a user performing an eye gesture may be extended to intersect with the environment imaged by the vehicle camera. A point of intersection of the vector with the environment may be mapped to the field of view of the vehicle camera and/or to the captured images from the vehicle camera (e.g., by performing a coordinate translation to convert the coordinate system used by the pointing/eye detection mechanism to the coordinate system used by the vehicle camera). A region of interest may be determined to be a region within a threshold distance of the point of intersection in the captured images. For example, the region of interest may include the point of intersection and may extend around the point of intersection according to a selected shape (e.g., a circle, an ellipse, a square, and/or another shape corresponding to a shape of the field of view of the vehicle camera). The selected shape may be selected and positioned based on the location of the point of intersection (e.g., if the point of intersection is near an edge of the field of view of the vehicle camera, the shape may be shifted such that the point of intersection is not centered, but such that the shape is aligned with the edge of the field of view of the vehicle camera). In other example, the region of interest may only include the point of intersection.

The user input may include a voice input, as indicated at 412, which may identify a location in the displayed view that is selected by the user to be a region of interest. For example, the voice input may include a cell identifier for a grid or another identifier for a portion of the displayed first view (e.g., "cell A3" or "upper left").

At 414, the method includes performing object recognition on the region of interest of the captured images (e.g., the images captured at the time the user input was detected and/or subsequently captured images). For example, the method may include performing edge detection (e.g., transforming the captured images into binary or reduced-color images to emphasize edges), cloud-based machine learning for matching features of the images to features of objects (e.g., using a database of common objects encountered during vehicle trips, such as trees, buildings, street signs, pedestrians, other vehicles, road markings, etc. to compare scanned pixels of the captured images), and/or otherwise processing the images to determine whether an object is present in the region of interest. In some examples, resources may be conserved by only performing object recognition in the region of interest (e.g., only transforming the region of interest into a binary image, only scanning pixels of the region of interest for comparison to known objects, etc.).

At 416, the method includes determining whether at least one object is detected in the region of interest. If an object is not detected in the region of interest (e.g., "NO" at 416), the method includes adjusting the first view of the vehicle camera to highlight the entire region of interest, as indicated at 418. At 420, the method includes displaying ongoing captured images in an ROI view based on the adjusted first view. For example, the ROI view may include only the region of interest, or may include the region of interest highlighted by differential focus, color, brightness, and/or other parameter(s) (e.g., the region of interest may be more in focus than other regions of the view, the region of interest may be in full color while other regions of the view are in black and white or greyscale, the region of interest may be brighter or more saturated than other regions of the view, the region of interest may be bounded by a box or other shape, etc.). At 422, the method includes determining if a user input is detected indicating a new region of interest. If such a user input is not detected (e.g., "NO" at 422), the method returns to continue highlighting the region of interest and displaying the ROI view. If a user input indicating a new region of interest is detected (e.g., "YES" at 422), the method returns to 416 to determine whether objects have been detected in the (new) region of interest.

Returning to 416, if at least one object is detected in the region of interest (e.g., "YES" at 416), the method includes adjusting the first view to highlight the object(s) in the region of interest, as indicated at 424. For example, the view may be zoomed and/or panned to only include and/or to center the object(s). As another example, the object(s) may be shown with a different focus, brightness, color, and/or other parameter than other elements in the view. Any combination of the above examples may be used to highlight the object(s) in the region of interest. For example, the view may include only the region of interest, and the detected object(s) may be centered in the view and shown with a greater amount of focus, brightness, and/or color than each other portion of the region of interest.

At 426, the method includes displaying captured images (e.g., ongoing captured images) in an object view based on the adjusted first view (e.g., to highlight the object(s)). As indicated at 428, the method includes continuously adjusting the view to track the detected object(s). At 430, the method includes determining if a user input is detected indicating a new region of interest. If such a user input is not detected (e.g., "NO" at 430), the method returns to continue highlighting and tracking the object(s) region of interest and displaying the object view. If a user input indicating a new region of interest is detected (e.g., "YES" at 430), the method returns to 416 to determine whether objects have been detected in the (new) region of interest.

The camera control scenario described with respect to FIGS. 3 and 4 provides an example of eye gaze/facial/pupil tracking and object recognition that may be performed by an in-vehicle computing system. In other examples, such eye tracking may be performed to provide user identification and monitoring, and may be used to learn behaviors and preferences of a user. For example, a pupil diameter of a user may be measured and compared to diameters associated with different user states and environmental conditions. A pupil diameter may change based on ambient light conditions, an alertness of a user, a mood of a user, and/or other conditions. Accordingly, such conditions may be associated with different pupil diameters in a look-up table or other database. The association between diameters and user/environmental states may be customized for different users based on a calibration routine and/or on-going monitoring of the user by the in-vehicle computing system and associated sensors and/or by other computing devices and sensors. Furthermore, data from other sensors may be used to interpret the pupil tracking data. For example, a light sensor or other camera may determine an ambient light condition for the user in order to separate light reflex from cognitive load or other user state-based pupil diameter changes (e.g., to distinguish a cause of the pupil diameter changes).

The behaviors and interactions of the user may be monitored over time and stored along with an indication of the user's pupil diameter while performing such behaviors and interactions. In this way, the in-vehicle computing system may learn behaviors and interactions associated with different pupil diameters. For example, whenever a user's pupil has below a threshold diameter and ambient light is above a threshold intensity, the user may flip down a visor, put on sunglasses, and/or squint to read content on a display. Accordingly, the in-vehicle computing system may learn these behaviors and trigger actions to assist the user when such conditions are experienced. For example, if the user squints to read content on a display every time the pupil diameter is below a threshold and the ambient light is above a threshold, the in-vehicle computing system may adjust a display brightness, contrast, or display mode when such conditions are met in order to make the display easier for the user to read in bright light environments. As another example, the in-vehicle computing system may determine that the user often drives erratically when the pupils are partially obscured by the user's eyelids and the ambient light is below a threshold. Accordingly, when detecting these conditions, the in-vehicle computing system may take measures to combat drowsiness by turning on a favorite radio station of the user, reducing cabin temperature, lowering windows, etc. The actions performed to assist the user in reducing drowsiness may be based on prior actions that were performed and that resulted in a reduction of drowsiness for that user and/or another change in the user state (e.g., that resulted in the pupils no longer being partially obscured by the user's eyelids and/or no longer being partially obscured by the user's eyelids within a threshold amount of time of performing the prior action or a threshold number of times after performing a same type of action as the prior action).

In some examples, the actions performed responsive to user/environmental conditions may be confirmed by a user before being performed. Using the above example, the in-vehicle computing system may present (e.g., visually, audibly, etc.) an indication that the windows are to be lowered. The in-vehicle computing system may lower the windows after receiving confirmation from the user (e.g., via voice, gesture, touch, or other user input) and may not lower the windows after not receiving confirmation from the user (e.g., receiving user input rejecting the action and/or not receiving user input within a threshold amount of time of providing the indication). The derivation of actions that are to be performed based on user/environmental conditions may also be confirmed by the user. For example, upon detecting that the user squints during high light/small pupil diameter conditions a threshold number of times, the in-vehicle computing system may present an indication to the user that the adjustment of the display (or the squinting condition) is to be associated with the detected light/pupil conditions. After receiving confirmation from the user, the in-vehicle computing system may update a database to reflect the association. For example, based on the confirmation from the user, the in-vehicle computing system may automatically (e.g., without further user confirmation) adjust the display when the above-described light/pupil conditions are detected. A user may also override an action that is automatically performed. The override may be considered when determining associations between conditions and actions, such that receipt of a threshold number of overrides for a given association may result in the removal of that association. For example, if the user later reverses the display adjustment more than a threshold number of times, the in-vehicle computing system may no longer automatically perform the display adjustment responsive to the light/pupil conditions described above.

The monitoring of biometric data of the user may also be used to determine the user's reaction to an action automatically triggered based on user/environment conditions. For example, rapid eye movement may indicate a heightened level of emotion of a user (e.g., excitement, frustration, fear, etc.). Based on learned behaviors of the user derived from the user's interaction with the in-vehicle computing system and/or other computing devices, the in-vehicle computing system may automatically trigger an action to calm the user responsive to detecting rapid eye movement. For example, the triggered action may include tuning a radio station to a user's favorite station and/or playing a song that has previously been observed to have a calming effect on the user. The user's eye movements may be continually monitored responsive to the action in order to determine whether the action has altered the user's state (e.g., whether the eye movements have slowed). In this way, multiple tiers of actions may be triggered based on whether or not a user responds to a triggered action. For example, if the user's eye movements are not slowed responsive to changing the music in the vehicle, the in-vehicle computing system may further trigger another action, such as changing interior cabin lights to emit a calming hue of light. The number of tiers of actions and the combination of actions in the tiers that result in an intended effect (e.g., a calming of a driver, a reduction of distraction or drowsiness of a driver, etc.) may be stored in association with a user profile or other identifier for the driver. In this way, future occurrences of the user state (e.g., the rapid eye movement, drowsiness, distractedness, etc.) may trigger the execution of the stored tiers of actions that were indicated to be successful in altering the user's state during previous executions. The stored information may be continually updated as more data is received (e.g., as more actions are performed and/or more user states are tracked).

Figure 5:
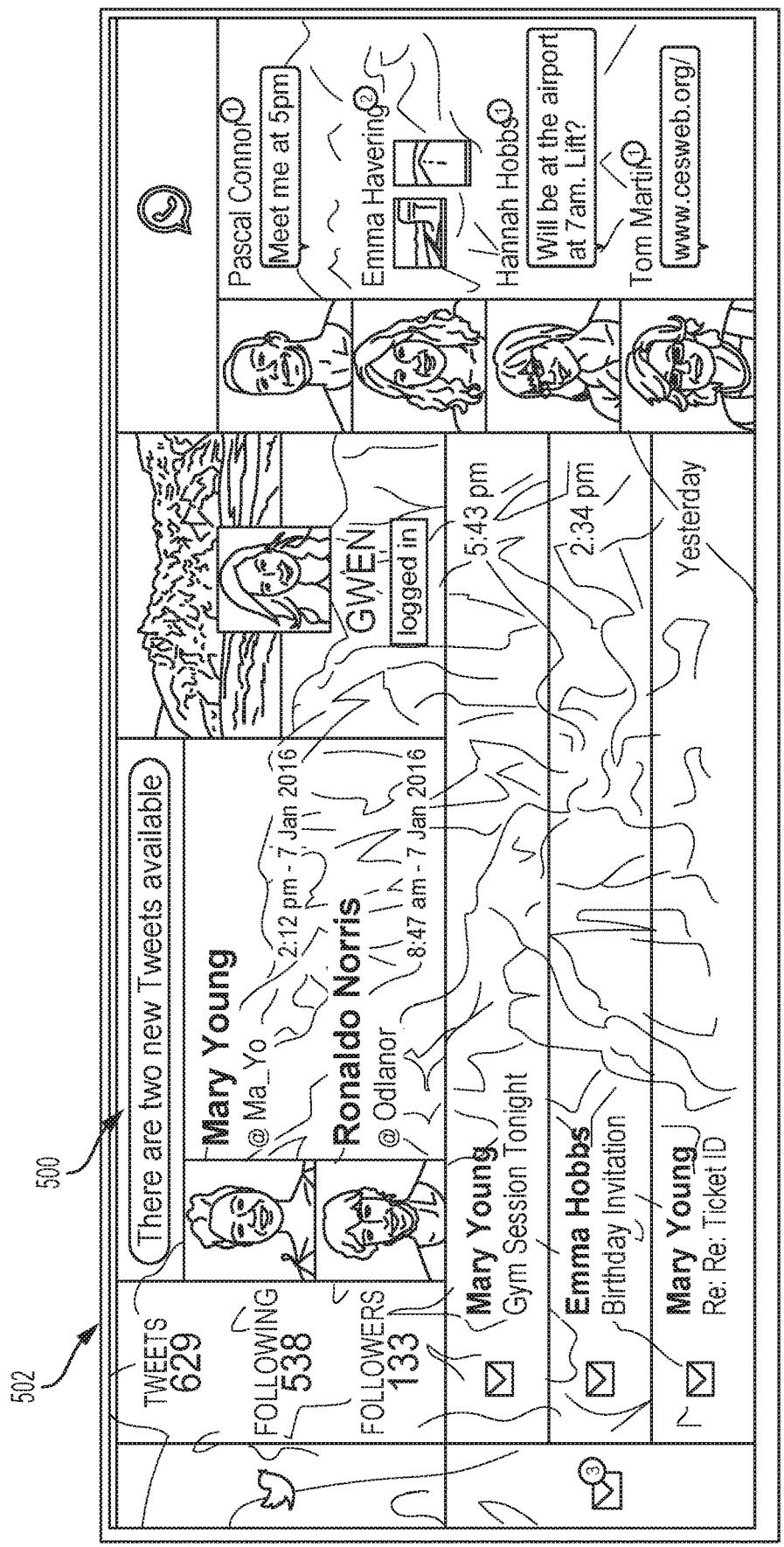
FIG. 5 shows an example user interface of a digital assistant in accordance with one or more embodiments of the present disclosure.

FIG. 5 shows an example user interface 500 for a digital assistant, which may be displayed on display 502. For example, display 502 may be a display of an in-vehicle computing system (e.g., in-vehicle computing system 109 of FIG. 1A and/or 200 of FIG. 2) and/or another display of an instrument panel (e.g., instrument panel 106 of FIGS. 1A and 1B). The user interface 500 may display social networking information, correspondences (e.g., email, text messages, etc.), contact information, and/or other information to assist a user in interacting with other users while in the vehicle environment.

The user interface 500 may represent one or more features of an interactive in-vehicle experience that may be adjusted based on an identified user, learned data associated with that identified user, and/or current conditions of the user/vehicle. For example, a color, arrangement of icons, theme, application, operating system, and/or other feature of the user interface 500 may be adjusted based on an identification of a user. The operation of the user interface may be continually changed based on an on-going monitoring of a state of the user and/or environmental conditions of the user. For example, if the user is determined to have a high cognitive load, the user interface may be simplified to show fewer items and/or larger interactive boxes. In some examples, the user input accepted or requested by the user interface may be adjusted based on a user/environmental condition. The adjustment of the user interface may be based on learned behaviors and preferences of the user providing input to the interface.

In some examples, feature usage patterns and segmentation relating to the use of electronic devices may be used to tailor an in-vehicle experience for a user based on the user's historical interaction with devices and features. For example, a type of mobile phone or mobile operating system utilized by a user may be determined and optionally compared to data regarding wireless connectivity protocols used by other mobile phones in order to control deployment of a user interface of an in-vehicle computing system and/or to select features for inclusion in the in-vehicle computing system. The use of voice recognition (e.g., the trends of voice recognition and/or the use of voice recognition by a user as compared to voice recognition trend data) may guide the deployment of voice-operated features relative to other mechanisms for user input (e.g., gesture input, button actuation, touch/hover input, etc.). The data may further indicate failure modes to guide deployment of upgrades or updates to the in-vehicle computing system, as well as predictive and preventative maintenance of the in-vehicle computing system. For example, the use of connectivity mechanisms may guide the deployment of upgrades or updates to the communication protocols and associated hardware of the in-vehicle computing system. The popularity of radio stations in a given location may be analyzed to determine a priority of radio stations in a station listing interface and/or the presence of radio interface elements in the user interface of the in-vehicle computing system.

Figure 6:
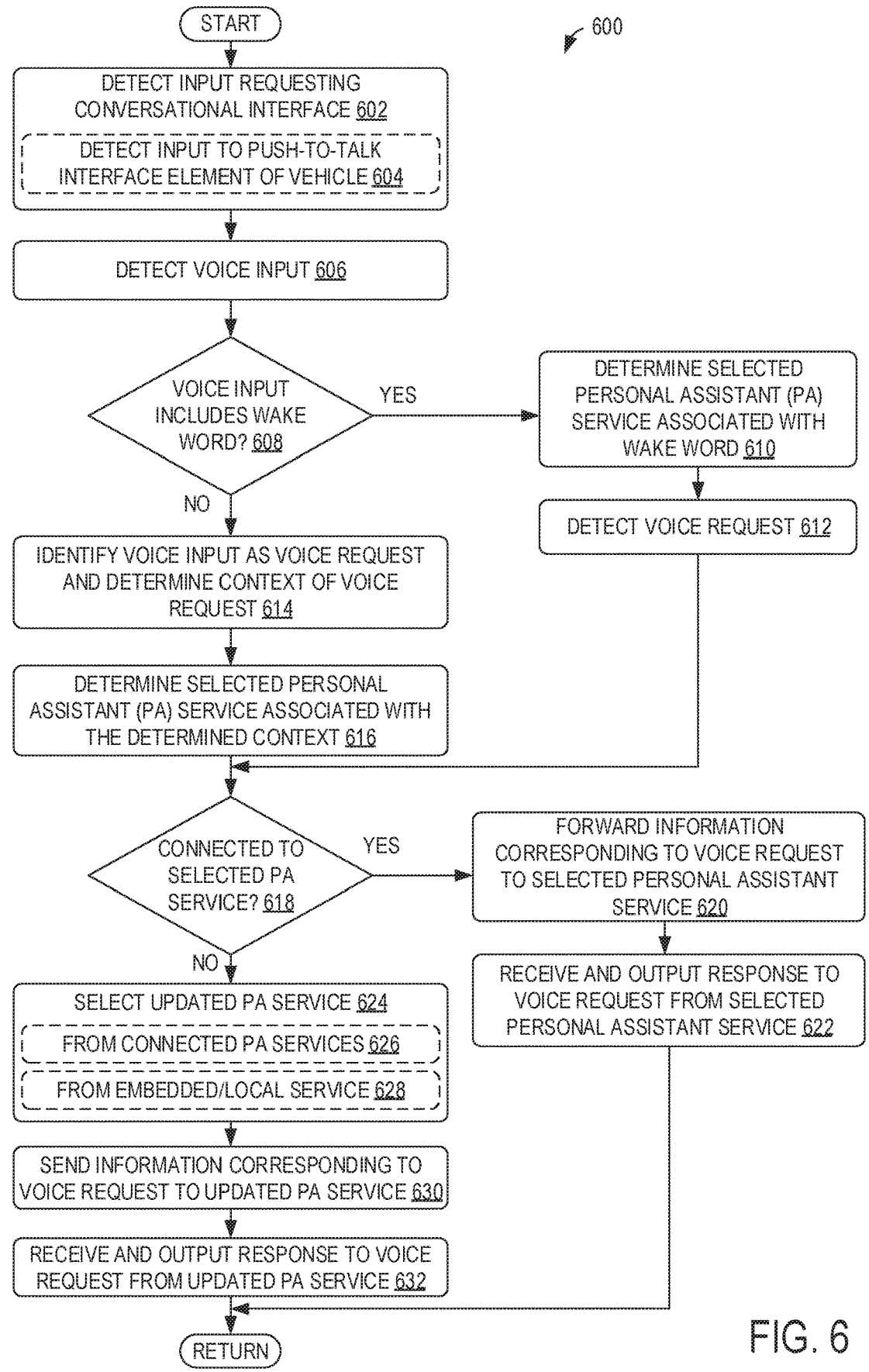
FIG. 6 shows a flow chart of an example method for providing a conversational user interface in a vehicle in accordance with one or more embodiments of the present disclosure.

Another example of personalizing a user experience in a vehicle includes leveraging internal vehicle controls and conversational interfaces as well as external/third-party personal assistants to service user requests in a vehicle. FIG. 6 is a flow chart of an example method 600 of providing a conversational user interface in a vehicle. Method 600 may be performed using any combination of the above-described devices. For example, at least some of the processing performed in method 600 may be performed by an in-vehicle computing system, such as in-vehicle computing system 109 of FIG. 1A and/or in-vehicle computing system 200 of FIG. 2. At 602, the method includes detecting input requesting a conversational interface. For example, the input may include input to a push-to-talk interface element (e.g., a steering wheel or other vehicle instrument panel control element) of a vehicle, as indicated at 604. At 606, the method includes detecting a voice input.

As described above, method 600 may be used to leverage personal assistant services while in a vehicle environment. As some personal assistant services utilize a wake word to trigger the service endpoint (e.g., a voice detection unit) to begin listening for a user request, the method includes determining if the voice input includes a wake word at 608. Although referred to as a wake word, it is to be understood that the wake word may include any suitable voice data string, which may be a word, phrase, tone, or other predefined sound. For example, the wake word may include an identifier for the personal assistant service and/or one or more other natural language greeting words (e.g., "Hey Fred"). If the voice input includes a wake word (e.g., "YES" at 608), the method includes determining a selected personal assistant service associated with the wake word, as indicated at 610. For example, the in-vehicle computing system may store and/or access a list of wake words, each associated with a personal assistant service (e.g., each wake word may only be associated with a single personal assistant service, but each personal assistant service may be associated with a plurality of wake words). The in-vehicle computing system may determine that the voice input includes a wake word if the voice input includes a voice data stream that matches a wake word in the above-described list. Accordingly, the in-vehicle computing system may map the detected wake word to the associated personal assistant (PA) service to designate that PA service as the selected PA service. Since the user may provide a voice request separately from providing the wake word, the method further includes detecting a voice request at 612. The voice request may be included in the voice input detected at 606 or may be detected as additional voice input at 612.

Returning to 608, if the voice input does not include a wake word (e.g., "NO" at 608), the method includes identifying the voice input as a voice request and determining a context and/or content of the voice request, as indicated at 614. It is to be understood that the voice request identified at 614 may also include additional voice data detected after the voice input detected at 606 in some examples. In examples where the voice input does not include a wake word, the system may determine a suitable personal assistant service for servicing the voice request. Accordingly, at 616, the method includes determining a selected personal assistant service associated with the determined context. For example, each personal assistant service of a plurality of possible personal assistant services (e.g., each PA service in the list described above) may be different from one another, and may be suited for different contexts from at least one other PA service. As a non-limiting example, a first PA service may be configured for handling shopping-based requests, while a second PA service may be configured for handling navigation- or map-based requests, and a third PA service may be configured for handling general internet search or information gathering requests.

The configuration of the PA services may include different hierarchical menu structuring (e.g., a shopping PA service may provide filtering options to assist a user in finding a product, or be configured to request more information regarding pricing, store preferences, item condition, etc., while a mapping PA service may provide a menu for selecting a navigation destination using prompts for address [e.g., requesting state, then city, then street, etc.], points of interest, distance range, etc.). The configuration of the PA services may additionally or alternatively include different natural language databases (e.g., an internet search PA service may have access to more/larger general use dictionaries than a mapping PA service, which may have access to navigation-related dictionaries including city names, street names, cardinal directions, etc., and a personal calendar PA service may populate a dictionary with words from the user [e.g., calendar appointments, messaging correspondences, etc.]).

The differences in configuration of the different PA services may result in each type of PA service (e.g., mapping, shopping, internet query, news, multimedia, travel, personal calendar, etc.) providing a different response to a same voice request. For example, a voice request that includes the key words of "dentist" may result in an output of navigation instructions to a nearest dentist by the mapping PA service, an output of a recent news story involving dentists from a news PA service, an output of a most popular song including the word "dentist" in the title or artist name by the multimedia PA service, or an output of an indication of an upcoming dentist appointment from a personal calendar PA service. Accordingly, determining a context of a voice request may assist a user in receiving an intended output by forwarding the request to the associated PA service for the request. Using the above example, if the voice request includes natural language components indicating a request for an appointment time (e.g., "When is my next dentist appointment," where "appointment" and "when" indicate a calendar context), the request may be forwarded to a personal calendar PA service. Alternatively, if the voice request includes natural language components indicating a request for directions to a dentist office (e.g., "Where is the nearest dentist," where "where" and "nearest" indicate a mapping context), the voice request may be forwarded to a mapping PA service. Other inputs may be used to determine a context of the voice request. For example, if the user was reading a news article about a dentist prior to entering a vehicle, the user may wish to continue hearing the news story while in the vehicle. Accordingly, information regarding the user's recent browsing activity may be used as an input to determine a context when the user requests more information about a dentist. Multiple different input sources may be consulted when determining a context of the voice request at 614 and determining a selected PA service at 616. The determination of the context of the voice request and the determination of the selected PA service at 614 and 616 may be performed at the in-vehicle computing system, at a deep learning (or other cloud-based computing) system, at a mobile device, and/or at any combination of the above-referenced devices.

At 618, the method includes determining whether the in-vehicle computing system is connected to the selected personal assistant service (e.g., the PA service identified by the wake word at 610 or the PA service identified based on a context of the voice request at 616). If the in-vehicle computing system is connected to the selected PA service (e.g., "YES" at 618), the method includes forwarding information corresponding to the voice request (e.g., the raw voice data for the voice request and/or at least partially processed voice data [e.g., translated with a local voice-to-text algorithm by the in-vehicle computing system]) to the selected personal assistant at 620. In examples where the selected personal assistant is selected based on a context of the voice request (e.g., rather than based on the utterance of an associated wake word), the in-vehicle computing system may, in some examples, forward simulated voice data replicating a wake word associated with the selected personal assistant service to the selected personal assistant service in order to activate the selected personal assistant service. The selected personal assistant service may process the request, determine a response, and transmit the response (e.g., either a partial/keyword response including words to be filled into a natural language template at the in-vehicle computing system, or a full, already-formed natural language response) to the in-vehicle computing system. Accordingly, at 622, the method includes receiving and outputting the response to the voice request from the selected personal assistant service. In some examples, the response may be a prompt for more information (e.g., where the prompt and/or the additional information being requested is based on a hierarchical structure associated with the type of the selected personal assistant), in which case the method may continue to listen for voice input corresponding to the request and forward the voice input to the selected personal assistant.

If the in-vehicle computing system is not connected to the selected PA service (e.g., "NO" at 618), the method includes selecting an updated PA service at 624. For example, the updated PA service may be another PA service selected from a list of connected PA services to which the in-vehicle computing system is connected, as indicated at 626. In such examples, the updated PA service may be a next-closest PA service to the selected PA service (e.g., a PA service that is the same type as the selected PA service, or a PA service that includes the capability of servicing requests associated with the type of the selected PA service). In other examples, the updated PA service may include an embedded and/or local voice recognition/natural language response service for the vehicle, as indicated at 628. At 630, the method further includes sending information corresponding to the voice request (e.g., the raw voice data and/or at least partially processed voice data, as described above at 620) to the updated PA service. In examples where the updated PA service is an embedded/local service, the voice request may be processed locally (e.g., a request to change a radio station may be processed locally and used to generate instructions to control the radio tuner of the vehicle) and/or transmitted to an off-board processing service for parsing and/or fulfilling the request (e.g., the language processing may be performed off-board the vehicle, while the voice request fulfillment may be handled locally at the vehicle). At 632, the method includes receiving and outputting a response to the voice request from the updated PA service. In examples where the updated PA service is an embedded/local service, the output response may include control instructions for controlling a vehicle system (e.g., controlling the radio tuner in the example above).

Figure 7:
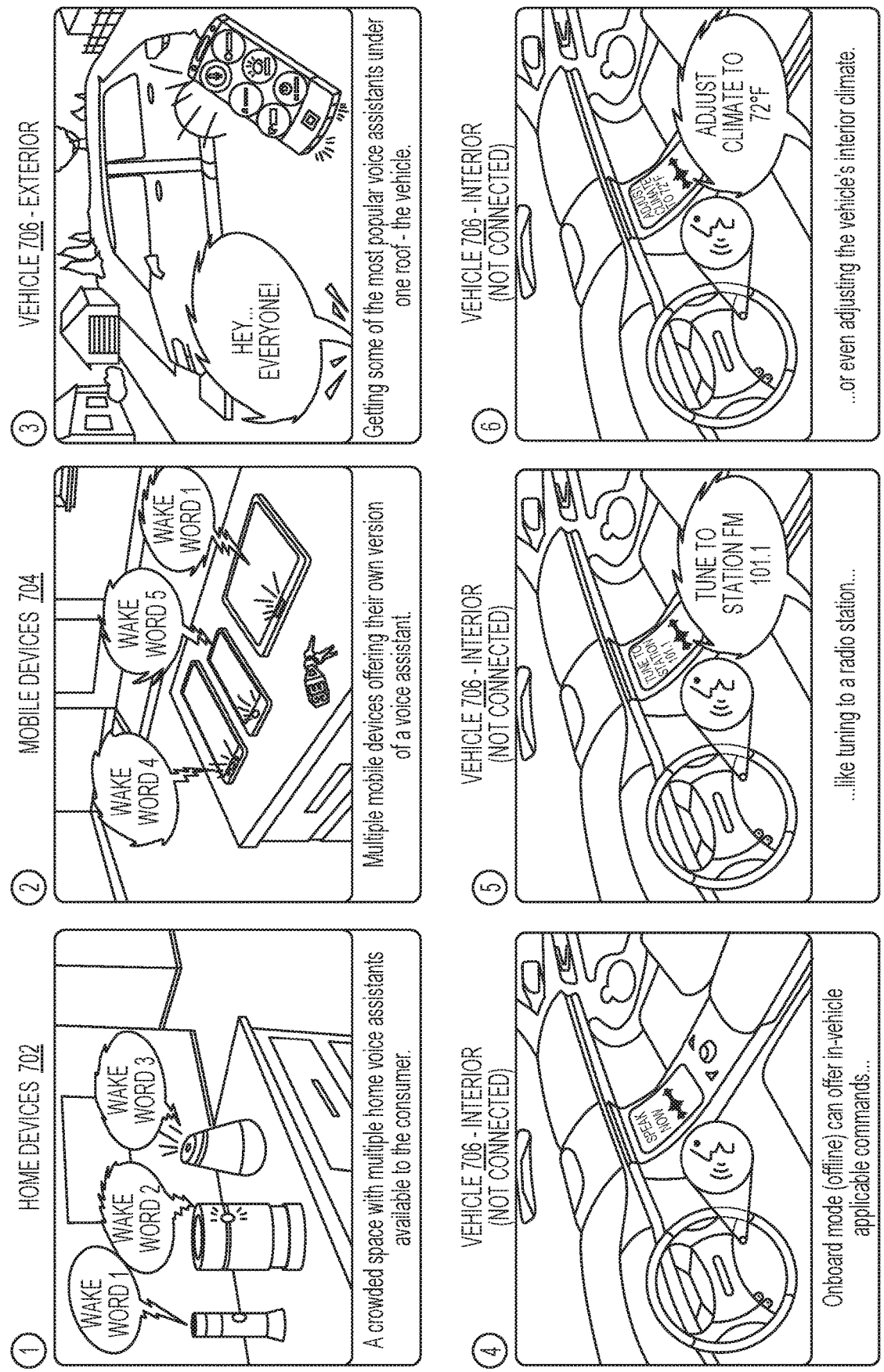
FIGS. 7 and 8 schematically show example scenarios for using multiple natural language services in a vehicle in accordance with one or more embodiments of the present disclosure.
Figure 8:
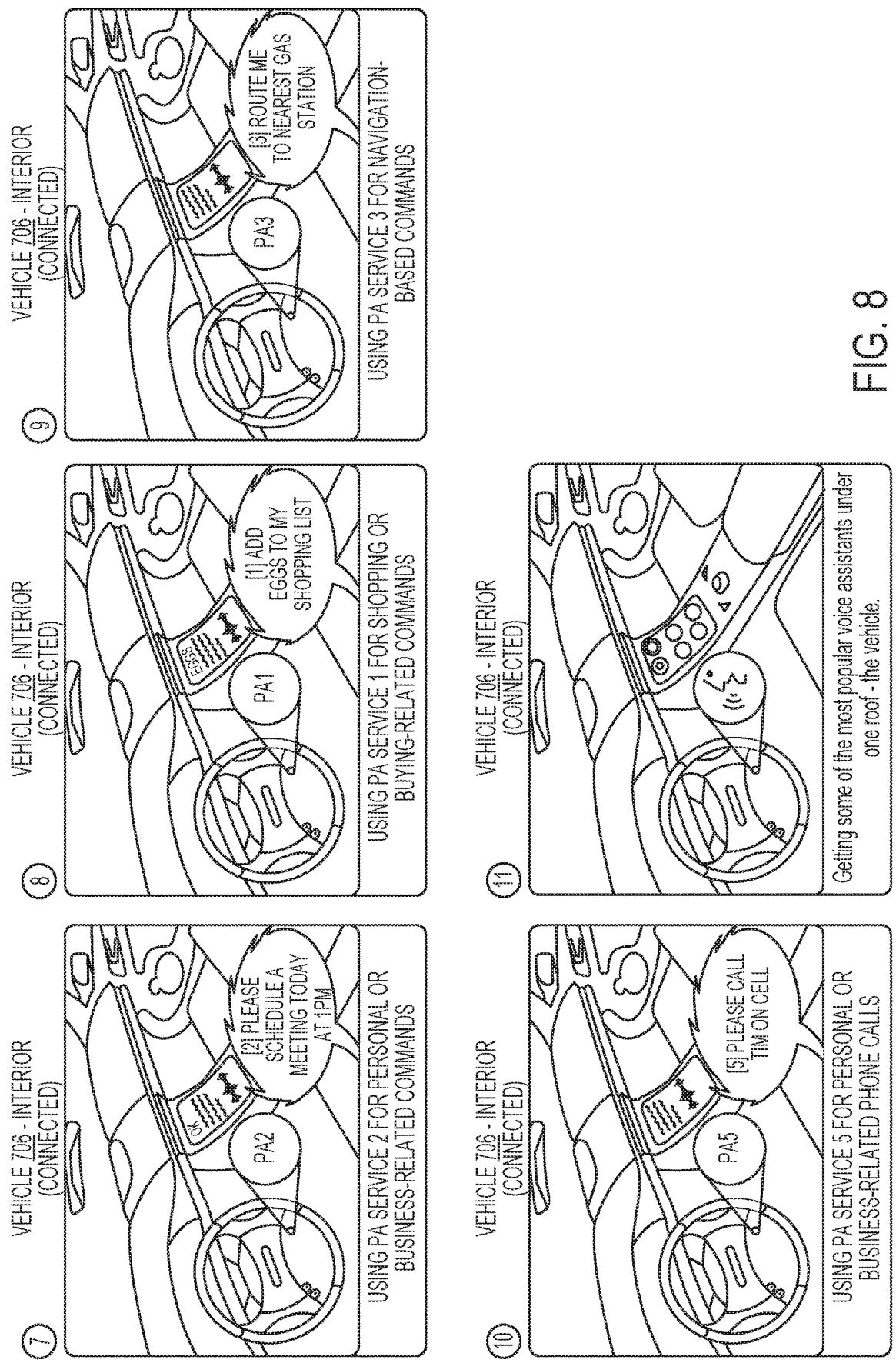

FIGS. 7 and 8 show example scenarios of responding to natural language requests in a vehicle environment. As shown in FIG. 7, personal assistant services may be used by home devices 702 and/or mobile devices 704. For example, the personal assistant service associated with wake word 1 is shown as being natively used by a home device and a mobile device. In the illustrated example, each depicted wake word is associated with a different personal assistant service (e.g., wake word 1 is associated with PA service 1, wake word 2 is associated with PA service 2, wake word 3 is associated with PA service 3, wake word 4 is associated with PA service 4, and wake word 5 is associated with PA service 5). As shown, the disclosure provides for access to each of the PA services within a vehicle 706. Furthermore, the onboard natural language system of the vehicle 706 may be used for in-vehicle applicable commands, including tuning a radio station or adjusting a vehicle temperature. These commands may be provided when the vehicle is not connected to a personal assistant service. FIG. 8 shows example voice commands/requests that may be routed to different PA services based on the content of the request/command. For example, PA service 2 may be called using wake word 2 and may be used for personal or business-related commands. PA service 1 may be called using wake word 1 and may be used for shopping or buying-related commands. PA service 3 may be called using wake word 3 and may be used for navigation-related commands. PA service 5 may be called using wake word 5 and may be used for personal or business-related phone calls. Furthermore, the onboard voice recognition system of the vehicle may be used when the vehicle is connected to a personal assistant service but the request/command is associated with a vehicle system. In this way, each connected personal assistant service may be selectively accessed and utilized for associated voice commands/requests.

Figure 9:
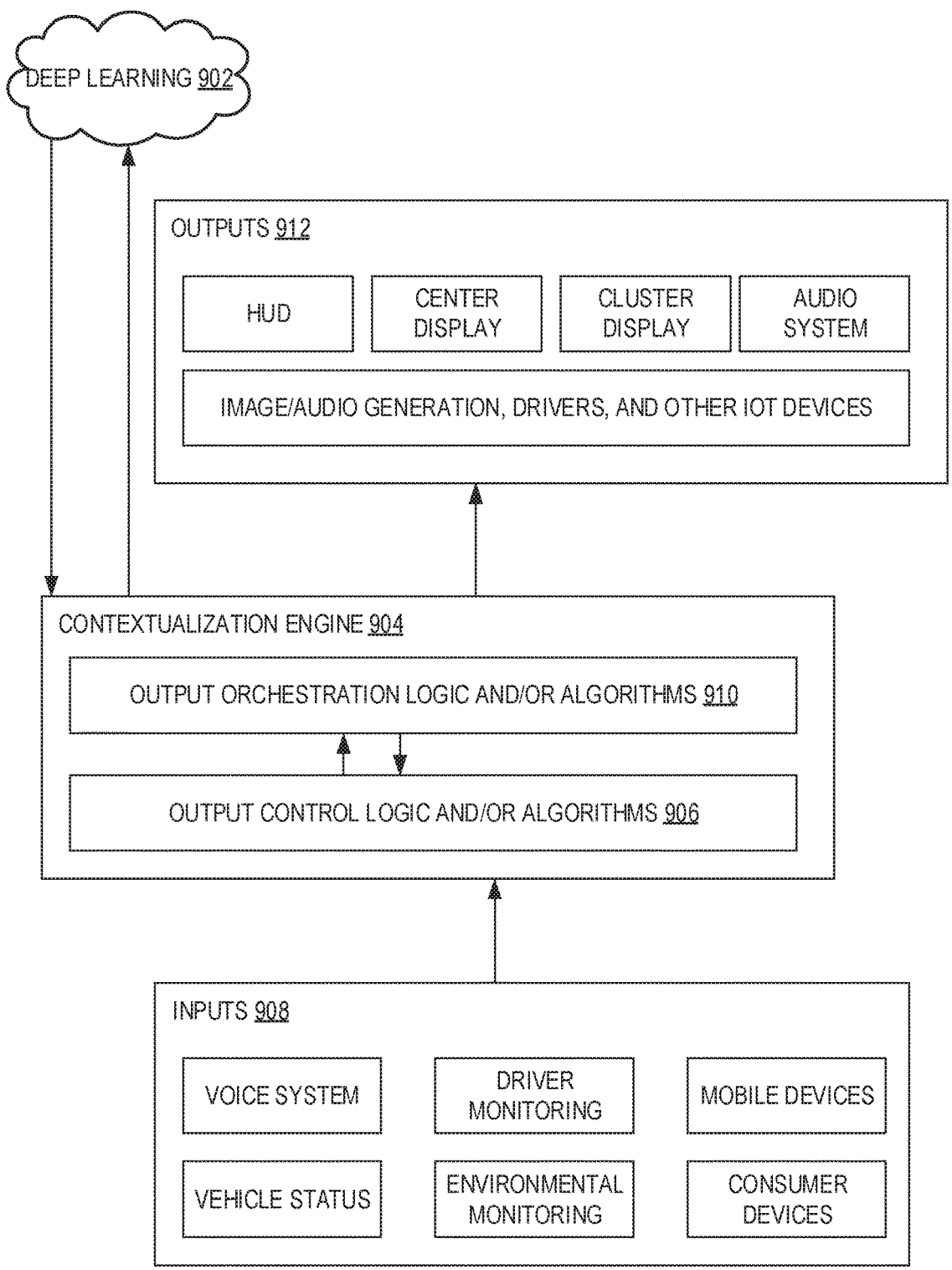
FIG. 9 shows an example computational flow of data for providing a user experience in a vehicle in accordance with one or more embodiments of the present disclosure.

FIG. 9 shows an example computational flow of data involved in one or more of the above-described methods and scenarios of providing a user experience (e.g., a personalized user experience) in a vehicle. The processing components may include a cloud-based deep learning processing system 902 and a contextualization engine 904. The cloud-based deep learning processing system 902 may be executed in one or more networked server (or other remote/extra-vehicle) devices. The contextualization engine 904 may be at least partially included in a vehicle (e.g., an in-vehicle computing system, such as in-vehicle computing system 109 of FIG. 1A and/or in-vehicle computing system 200 of FIG. 2). In some examples, one or more components (e.g., processing modules, which may include portions of instructions stored on one or more memory devices and executable by a processing device to perform one or more portions of the methods and processes described herein) may be distributed amongst or included in one or more of a vehicle device (e.g., in-vehicle computing system of a vehicle), mobile device (e.g., within the vehicle and communicatively connected to the in-vehicle computing system), cloud computing system, and/or other computing devices.

The contextualization engine 904 may include output control logic and/or algorithms 906. For example, output control logic and/or algorithms may determine whether or not information is to be provided (e.g., output, via a vehicle device or another device within the vehicle) to a driver given a current context (e.g., a driver status, a vehicle status, a detected event, etc.). The current context may be determined based on one or more inputs 908. FIG. 9 shows a non-limiting collection of example inputs, including a voice system (e.g., voice recognition system, including a microphone and/or components for detecting, parsing, and/or interpreting voice input). Inputs 908 may also include a driver monitoring system (e.g., including a gesture monitoring system) for detecting, identifying, and/or monitoring aspects of a driver (e.g., driver behavior, identity, mood, movements, gestures or other inputs for interacting with the vehicle, etc.). Inputs 908 may also include a mobile device or other device communicatively connected to the vehicle and/or a vehicle system. The mobile device may include one or more native applications and/or third-party applications and may include applications for managing communications (e.g., messaging), schedules/calendars, web browsing/searching, navigation, personal assistants, etc. Other examples of inputs 908 include vehicle status monitoring systems and environment monitoring system (e.g., both of which may be achieved using Advanced Driver-Assistance Systems (ADAS)), as well as consumer devices (e.g., smart home speakers, wearables, etc.).

The inputs 908 may transmit data to the contextualization engine for processing by the output control logic and/or algorithms 906 alone or with the assistance of the deep learning system 902. For example, the output control logic and/or algorithms 906 may receive the data from inputs 908 and evaluate whether the inputs indicate an event or otherwise trigger a potential for output. Input data that indicates an event may include input from a messaging application indicating a receipt of a message for a driver of the vehicle, input from a vehicle system indicating a vehicle status that is to be communicated to a driver (e.g., notification of an available system upgrade, notification of a service request due to failure of a vehicle device or due to expiration of a timer relating to a regular maintenance item, notification of detected unsafe driving such as exceeding a posted speed limit, erratic steering/braking/acceleration, etc.), input from a voice system or driver monitoring system indicating a user request for an output, information from an environmental monitoring system indicating a detected obstacle, etc. Input data that otherwise triggers a potential for output may include input from a driver monitoring system, vehicle status system, or environmental monitoring system that, when analyzed, indicates a noteworthy change that may be communicated to the driver (e.g., indicating that a stress level of the driver has increased, indicating that the vehicle is performing unusually, indicating a change in environmental conditions such as weather, visibility, etc.).

The deep learning system 902 may be utilized by the output control logic and/or algorithms to determine and/or confirm one or more of the above indicators of a potential for outputting information. For example, the deep learning system 902 may include machine learning algorithms that utilize multiple layers of non-linear processing units for feature extraction and transformation of data received by the inputs (instantaneously and historically), where each layer uses output from at least one other (e.g., prior) layer. The machine learning algorithms may perform pattern analysis, event and/or data classification, object/image and/or speech recognition, natural language processing, and/or other processing using artificial neural networks/deep neural nets, propositional formulas, credit assignment paths (e.g., chains of transformations from input to output to describe causal connections between input and output), generative models (e.g., nodes in Deep Belief Networks and Deep Boltzmann Machines). For example, interactions of a driver with the in-vehicle computing system (e.g., responsive to outputs) under particular contexts/conditions may be monitored such that recurrences of contexts/conditions may result in outputs (or lack of outputs) that are most relevant for a driver.

As an illustrative example, if a driver quickly dismisses a notification of a change of weather whenever the vehicle is below a certain speed, the deep learning system 902 and/or output control logic and/or algorithms 906 may associate the low speed with a lack of interest in weather updates. Accordingly, the output control logic and/or algorithms 906 may control outputs to suppress future weather updates when the vehicle is below the certain speed. The deep learning system 902 and/or output control logic and/or algorithms may continuously evolve the association to adjust the threshold speed used for suppressing weather updates based on driver responses. Furthermore, the deep learning system 902 may create connections between the driver's disinterest in updates for weather alerts to a likely disinterest in updates for other low urgency alerts. In this way, the deep learning system 902 may apply a driver's response to output under one context to determine a likely driver response to output under another, similar, context and/or to determine a likely driver response to another, similar output to the same context.

The output control logic and/or algorithms 906 may communicate with an output orchestration logic and/or algorithms 910 of the contextualization engine 904 to indicate whether an output is to be provided based on the detected context (e.g., based on data from inputs 908). In instances where an output is to be provided, the output orchestration logic and/or algorithms 910 determine a type of output and a mechanism for providing the output. The output orchestration logic and/or algorithms 910 may provide instructions to one or more outputs 912 to instruct the one or more outputs 912 to provide the output and/or to provide the output according to one or more parameters (e.g., a type of output, duration of output, content of output, etc.). The outputs 912 may include a heads-up display, center display, and/or cluster display of a vehicle (e.g., touch screen 108 of FIG. 1A and/or one or more of the displays of FIG. 1B) for providing image or video/animation output in some examples. Outputs 912 may additionally or alternatively include an audio system (e.g., including vehicle speakers such as speaker 112 of FIG. 1A) for providing audio output in some examples. It is to be understood that the outputs 912 may include any other image/audio generation, drivers, and/or other internet-of-things devices in the above or alternative examples.

The output orchestration logic and/or algorithms 910 may utilize one or more of the processing algorithms discussed above with respect to the deep learning system 902 and the output control logic and/or algorithms 906 to determine a type, a mechanism, and/or other parameters of an output that is to be presented based on the context. For example, a driver's prior interaction with certain types of outputs (e.g., audio vs. visual, long vs. short durations, etc.) may be correlated with contexts similarly to the scenario described above for determining whether to issue an output. Accordingly, the actions of a driver responsive to different types of outputs may be used to determine a type of output to provide for a given context.

Another example provides for an in-vehicle computing system of a vehicle, the in-vehicle computing system including a display device, a hardware interface communicatively connecting the in-vehicle computing system to one or more vehicle devices, a processor, and a storage device storing instructions executable by the processor to identify a user in the vehicle, detect one or more behaviors of the user, and adapt the display device and/or at least a selected vehicle device of the one or more vehicle devices based on the one or more detected behaviors of the identified user to provide a personalized interactive experience for the identified user. In a first example of the in-vehicle computing system, the in-vehicle computing system may additionally or alternatively further include a sensor subsystem configured to receive input from at least one sensor, and the instructions may additionally or alternatively be further executable to identify the user in the vehicle and/or other occupants of the vehicle based on one or more of eye, facial, and pupil recognition using the input from the at least one sensor. A second example of the in-vehicle computing system optionally includes the first example, and further includes the in-vehicle computing system, wherein the one or more behaviors of the user include a gesture performed by the user, wherein the one or more vehicle devices includes a camera configured to detect an environment of the vehicle, and wherein instructions are further executable to display a view of the camera via the display device, and detect the gesture and adjust operation of the camera and/or adjust the displayed view of the camera based on the detected gesture. A third example of the in-vehicle computing system optionally includes one or both of the first example and the second example, and further includes the in-vehicle computing system, wherein the instructions are further executable to perform object recognition on images from the camera based on the detected gesture, and wherein adjusting operation of the camera and/or adjusting the displayed view of the camera includes selecting a sub-section of the field of view of the camera including an object of interest that intersects with a direction indicated by the gesture, and adjusting the view of the camera displayed on the display device to focus on the object. A fourth example of the in-vehicle computing system optionally includes one or more of the first through the third examples, and further includes the in-vehicle computing system, wherein adjusting the view of the camera displayed on the display device to focus on the object includes increasing a zoom level of the view of the camera displayed on the display device to increase a size of the object of interest as displayed on the display device. A fifth example of the in-vehicle computing system optionally includes one or more of the first through the fourth examples, and further includes the in-vehicle computing system, further including a communication interface adapted to communicatively couple the in-vehicle computing system to one or more of a cloud computing device and/or one or more other vehicles. A sixth example of the in-vehicle computing system optionally includes one or more of the first through the fifth examples, and further includes the in-vehicle computing system, wherein detecting the one or more behaviors of the user includes monitoring a user state by aggregating inputs from user interactions, multiple vehicle inputs, and other auxiliary vehicle data in conjunction with a cloud-based deep learning engine of the cloud computing device to derive trends in the user state and reactions to adaptations of the display device and/or the selected vehicle device. A seventh example of the in-vehicle computing system optionally includes one or more of the first through the sixth examples, and further includes the in-vehicle computing system, wherein the instructions are further executable to monitor the one or more behaviors of the user over time and build a database of user preferences based on the monitored one or more behaviors. An eighth example of the in-vehicle computing system optionally includes one or more of the first through the seventh examples, and further includes the in-vehicle computing system, wherein detecting the one or more behaviors of the user includes detecting a voice input from the user, the instructions further executable to selectively forward the voice input to a selected personal assistant service of a plurality of personal assistant services based on a context of the voice input. A ninth example of the in-vehicle computing system optionally includes one or more of the first through the eighth examples, and further includes the in-vehicle computing system, wherein detecting the one or more behaviors of the user includes monitoring a pupil diameter of the user, wherein the pupil diameter of the user is associated with a user state. A tenth example of the in-vehicle computing system optionally includes one or more of the first through the ninth examples, and further includes the in-vehicle computing system, wherein the instructions are further executable to determine one or more current environmental conditions and interpret pupil diameter in consideration of the one or more current environmental conditions by accessing a database that includes associations between pupil diameters and environmental conditions for the user. An eleventh example of the in-vehicle computing system optionally includes one or more of the first through the tenth examples, and further includes the in-vehicle computing system, wherein the instructions are further executable to provide a conversational voice assistant configured to interact with the user via natural language audio input recognition and natural language audio output presentation. A twelfth example of the in-vehicle computing system optionally includes one or more of the first through the eleventh examples, and further includes the in-vehicle computing system, wherein the instructions are further executable to present to the user proposed automatic changes to adapt the display device and/or the selected vehicle device based on the one or more detected behaviors of the identified user, and wherein the display device and/or the selected vehicle device is adapted responsive to receiving user input confirming the proposed automatic changes and the display device and/or the selected vehicle device is not adapted responsive to not receiving user input confirming the proposed automatic changes. A thirteenth example of the in-vehicle computing system optionally includes one or more of the first through the twelfth examples, and further includes the in-vehicle computing system, wherein the proposed automatic changes are based on one or more of real-time biometric data for the user, sensor data from one or more sensors of the vehicle, and historical data for the user.

Another example provides for a method for an in-vehicle computing system, the method including identifying a user in the vehicle, detecting one or more behaviors of the user, and adapting a display device and/or a vehicle device based on the one or more detected behaviors of the identified user to provide a personalized interactive experience for the identified user. In a first example of the method, the one or more behaviors of the user may additionally or alternatively include a gesture performed by the user, and the vehicle device may additionally or alternatively include a camera configured to detect an environment of the vehicle, and the instructions may additionally or alternatively be further executable to display a view of the camera via the display device, and detect the gesture and adjust operation of the camera and/or adjust the displayed view of the camera based on the detected gesture. A second example of the method optionally includes the first example, and further include the method, wherein detecting the one or more behaviors of the user includes monitoring a user state by aggregating inputs from user interactions, multiple vehicle inputs, and other auxiliary vehicle data in conjunction with a cloud-based deep learning engine of the cloud computing device, and deriving trends in the user state and reactions to adaptations of the display device and/or the vehicle device.

Another example provides for an in-vehicle computing system of a vehicle, the in-vehicle computing system including a display device, a hardware interface communicatively connecting the in-vehicle computing system to one or more vehicle devices, a processor, and a storage device storing instructions executable by the processor to identify a user in the vehicle, detect one or more behaviors of the user indicating a user state, detect one or more environmental conditions of the vehicle, access a database correlating user interactions with the one or more vehicle devices during different user states and environmental conditions, and adapt the display device and/or at least a selected vehicle device of the one or more vehicle devices based on the one or more detected behaviors of the identified user and based on a selected user interaction associated with the indicated user state and the detected one or more environmental conditions in the database. In a first example of the in-vehicle computing device, the one or more behaviors may additionally or alternatively include a pupil diameter being below a threshold diameter while ambient light is above a threshold light level, and adapting the display device and/or selected vehicle device may additionally or alternatively include adjusting one or more of a brightness, contrast, and display mode of the display device. A second example optionally includes the first example, and further includes the in-vehicle computing system, wherein the instructions are further executable to adapt the display device and/or the selected vehicle device based on prior adaptations to the display device and/or the selected vehicle device that resulted in a change of the indicated user state.

Another example provides for an in-vehicle computing system of a vehicle, the in-vehicle computing system including a display device, a hardware interface communicatively connecting the in-vehicle computing system to one or more vehicle devices and one or more external personal assistant services, a processor, and a storage device storing instructions executable by the processor to detect a voice input, determine if the voice input includes a wake word, responsive to determining that the voice input includes a wake word, identifying a first selected personal assistant service from the one or more external personal assistant services, the first selected personal assistant service being associated with the wake word, and forward information corresponding to a voice request of the user to the first selected personal assistant service, and, responsive to determining that the voice input does not include a wake word, identifying a second selected personal assistant service from the one or more external personal assistant services, the second selected personal assistant service being selected by matching a context of the voice input to a type of the second selected personal assistant, and forward the information corresponding to the voice request of the user to the second selected personal assistant service. In a first example, the in-vehicle computing system additionally or alternatively further includes instructions executable to receive a response from one of the first or the second selected personal assistant services, and perform an action corresponding to the response. A second example optionally includes the first example, and further includes the in-vehicle computing system, wherein the action includes one or more of controlling the display to output the response, controlling a speaker of the vehicle to output the response, and controlling a device connected to the in-vehicle computing system to perform an action associated with the response. A third example optionally includes one or both of the first and the second examples, and further includes the in-vehicle computing system, wherein the context of the voice input includes a content of the voice input, a state of a user providing the voice input, and/or a state of the vehicle.

Another example provides for a method including, depending on whether a vehicle's communication system is connected to a remote system (such as a remote server or remote network external the vehicle including a cloud based system), responding to a user voice request with a first response based only on in-vehicle data; and when connected to the remote system, responding to the same user voice request with a second, different response based on at least remote data. In a first example of the method, the method additionally or alternatively includes responding to the user voice request with the first response when the vehicle's communication system is not connected to the remote system.

Another example provides for a method including, responding to a first user voice request of a user via enabling (and/or commencing a process) with a first remote service that provides a first prompt to the user based on the user's first voice request, and responding to a second, different, user voice request via enabling (and/or commencing a process), with a second, different remote service that provides a second, different, audio prompt to the user based on the user's second voice request. In a first example of the method, the difference between the first and second voice requests may additionally or alternatively include that the user provides different service names and/or may be based on a context of the user's requests.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 described with reference to FIG. 1 and/or in-vehicle computing system 200 described with reference to FIG. 2, in combination with computing system 300 described with reference to FIG. 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system of a vehicle, the in-vehicle computing system comprising:
    a display device;
    a hardware interface communicatively connecting the in-vehicle computing system to one or more vehicle devices, the one or more vehicle devices including a camera detecting an environment of the vehicle;
    a processor; and
    a storage device storing instructions executable by the processor to:
        identify a user in the vehicle;
        detect one or more behaviors of the user;
        determine an object of interest based on the one or more detected behaviors of the user and based on images captured by the camera, wherein the object of interest is separate from the user in the vehicle; and
        adapt the display device and/or at least a selected vehicle device of the one or more vehicle devices based on the one or more detected behaviors of the identified user to provide a personalized interactive experience for the identified user, wherein the personalized interactive experience includes adjusting a view on the display device that focuses on the object of interest.

2. The in-vehicle computing system of claim 1, further comprising a sensor subsystem configured to receive input from at least one sensor, wherein the instructions are further executable to identify the user in the vehicle and/or other occupants of the vehicle based on one or more of eye, facial, and pupil recognition using the input from the at least one sensor.

3. The in-vehicle computing system of claim 2, wherein the one or more behaviors of the user include a gesture performed by the user, and wherein instructions are further executable to display a view of the camera via the display device, and detect the gesture and adjust operation of the camera based on the detected gesture.

4. The in-vehicle computing system of claim 3, wherein detecting the object of interest includes performing object recognition on the images from the camera based on the detected gesture, and wherein adjusting operation of the camera and/or adjusting the view on the display device includes selecting a sub-section of a field of view of the camera including the object of interest that intersects with a direction indicated by the gesture, and adjusting the view of the camera displayed on the display device.

5. The in-vehicle computing system of claim 4, wherein adjusting the view of the camera displayed on the display device to focus on the object includes increasing a zoom level of the view of the camera displayed on the display device to increase a size of the object of interest as displayed on the display device.

6. The in-vehicle computing system of claim 2, further comprising a communication interface adapted to communicatively couple the in-vehicle computing system to one or more of a cloud computing device and/or one or more other vehicles.

7. The in-vehicle computing system of claim 6, wherein detecting the one or more behaviors of the user includes monitoring a user state by aggregating inputs from user interactions, multiple vehicle inputs, and other auxiliary vehicle data in conjunction with a cloud-based deep learning engine of the cloud computing device to derive trends in the user state and reactions to adaptations of the display device and/or the selected vehicle device.

8. The in-vehicle computing system of claim 1, wherein the instructions are further executable to monitor the one or more behaviors of the user over time and build a database of user preferences based on the monitored one or more behaviors.

9. The in-vehicle computing system of claim 8, wherein detecting the one or more behaviors of the user includes detecting a voice input from the user, the instructions further executable to selectively forward the voice input to a selected personal assistant service of a plurality of personal assistant services based on a context of the voice input.

10. The in-vehicle computing system of claim 1, wherein detecting the one or more behaviors of the user includes monitoring a pupil diameter of the user, wherein the pupil diameter of the user is associated with a user state.

11. The in-vehicle computing system of claim 10, wherein the instructions are further executable to determine one or more current environmental conditions and interpret pupil diameter in consideration of the one or more current environmental conditions by accessing a database that includes associations between pupil diameters and environmental conditions for the user.

12. The in-vehicle computing system of claim 1, wherein the instructions are further executable to provide a conversational voice assistant configured to interact with the user via natural language audio input recognition and natural language audio output presentation.

13. The in-vehicle computing system of claim 1, wherein the instructions are further executable to present to the user proposed automatic changes to adapt the display device and/or the selected vehicle device based on the one or more detected behaviors of the identified user, and wherein the display device and/or the selected vehicle device is adapted responsive to receiving user input confirming the proposed automatic changes and the display device and/or the selected vehicle device is not adapted responsive to not receiving user input confirming the proposed automatic changes.

14. The in-vehicle computing system of claim 13, wherein the proposed automatic changes are based on one or more of real-time biometric data for the user, sensor data from one or more sensors of the vehicle, and historical data for the user.

15. A method for an in-vehicle computing system, the method comprising:

via instructions executed by a processor of the in-vehicle computing system,
identifying a user in the vehicle;
detecting one or more behaviors of the user;
detecting an object of interest based on an intersection of the one or more detected behaviors of the identified user and an object of interest, wherein the object of interest is detected via a vehicle device, and wherein the object of interest is separate from the user in the vehicle; and
adapting a display device to show the object of interest and adjusting the vehicle device to focus on the object of interest for display on the display device based on the one or more detected behaviors of the identified user to provide a personalized interactive experience for the identified user, wherein the vehicle device comprises a camera configured to detect an environment of the vehicle.

16. The method of claim 15, wherein the one or more behaviors of the user include a gesture performed by the user.

17. The method of claim 15, wherein detecting the one or more behaviors of the user includes monitoring a user state by aggregating inputs from user interactions, multiple vehicle inputs, and other auxiliary vehicle data in conjunction with a cloud-based deep learning engine of the cloud computing device, and deriving trends in the user state and reactions to adaptations of the display device and/or the vehicle device.

18. An in-vehicle computing system of a vehicle, the in-vehicle computing system comprising:
a display device;
a hardware interface communicatively connecting the in-vehicle computing system to one or more vehicle devices;
a processor; and
a storage device storing instructions executable by the processor to:
identify a user in the vehicle;
detect one or more behaviors of the user indicating a user state;
detect one or more environmental conditions of the vehicle;
accessing a database correlating user interactions with the one or more vehicle devices during different user states and environmental conditions; and
adapt the display device and/or at least a selected vehicle device of the one or more vehicle devices based on the one or more detected behaviors of the identified user and based on a selected user interaction associated with the indicated user state and the detected one or more environmental conditions in the database, wherein the one or more detected behaviors of the user used to adapt the display device and/or the selected vehicle device includes a pupil diameter of the user.

19. The in-vehicle computing system of claim 18, wherein the one or more behaviors includes a pupil diameter being below a threshold diameter while ambient light is above a threshold light level, and wherein adapting the display device and/or selected vehicle device includes adjusting one or more of a brightness, contrast, and display mode of the display device.

20. The in-vehicle computing system of claim 18, wherein the instructions are further executable to adapt the display device and/or the selected vehicle device based on prior adaptations to the display device and/or the selected vehicle device that resulted in a change of the indicated user state.

* * * * *